United States Patent
Taguchi

(10) Patent No.: US 11,054,802 B2
(45) Date of Patent: Jul. 6, 2021

(54) SYSTEM AND METHOD FOR PERFORMING OPERATIONS OF NUMERICAL CONTROL MACHINES

(71) Applicant: Mitsubishi Electric Research Laboratories, Inc., Cambridge, MA (US)

(72) Inventor: Yuichi Taguchi, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 502 days.

(21) Appl. No.: 14/918,908

(22) Filed: Oct. 21, 2015

(65) Prior Publication Data
US 2017/0115653 A1    Apr. 27, 2017

(51) Int. Cl.
G05B 19/402    (2006.01)
G05B 19/4069   (2006.01)

(52) U.S. Cl.
CPC ....... G05B 19/402 (2013.01); G05B 19/4069 (2013.01); G05B 2219/33271 (2013.01); G05B 2219/36071 (2013.01); G05B 2219/36252 (2013.01)

(58) Field of Classification Search
CPC ........ G05B 19/402; G05B 2219/33271; G05B 19/4069; G05B 2219/36071; G05B 2219/36252
USPC ................................. 700/164, 251
See application file for complete search history.

(56) References Cited

U.S. PATENT DOCUMENTS

| 8,310,534 B2* | 11/2012 | Tian | G06T 7/593 |
| | | | 348/129 |
| 9,014,851 B2* | 4/2015 | Wong | A61B 17/00 |
| | | | 700/245 |
| 9,519,736 B2* | 12/2016 | Atohira | G06F 17/5009 |

(Continued)

FOREIGN PATENT DOCUMENTS

| EP | 2216697 | * 8/2020 | G05B 19/4061 |
| JP | S61293752 A | 12/1986 | |

OTHER PUBLICATIONS

Taguchi et al, "Point-Plane SLAM for Hand-Held 3D Sensor", May 2013. pp. 5182-5189. (Year: 2013).*

(Continued)

*Primary Examiner* — Rocio Del Mar Perez-Velez
*Assistant Examiner* — Olvin Lopez Alvarez
(74) *Attorney, Agent, or Firm* — Gennadiy Vinokur; Hironori Tsukamoto

(57) ABSTRACT

A method for machining a workpiece by a numerical control (NC) machine constructs a model of a scene from one or multiple images including at least a part of the workpiece and a part of the NC machine and registers a model of the NC machine with the model of the scene to produce a first transformation between a coordinate system of the model of the scene and a coordinate system of the NC machine. The method also detects the workpiece in the model of the scene to produce a second transformation between the coordinate system of the model of the scene and a coordinate system of the workpiece and combines the first and the second transformations to register the coordinate system of the workpiece with the coordinate system of the NC machine. The registered workpiece is machined with a tool of the NC machine.

10 Claims, 5 Drawing Sheets

(56) References Cited

U.S. PATENT DOCUMENTS

| | | | |
|---|---|---|---|
| 2004/0172164 A1* | 9/2004 | Habibi | B25J 9/1692 700/245 |
| 2004/0258309 A1* | 12/2004 | Keaton | G06K 9/6255 382/190 |
| 2006/0072809 A1* | 4/2006 | Hashimoto | B25J 9/1697 382/153 |
| 2007/0142973 A1* | 6/2007 | Takizawa | B25J 9/1671 700/259 |
| 2008/0250659 A1* | 10/2008 | Bellerose | G05B 19/402 33/1 MP |
| 2009/0070077 A1 | 3/2009 | Tian et al. | |
| 2011/0063403 A1* | 3/2011 | Zhang | G06T 7/75 348/14.1 |
| 2011/0257777 A1* | 10/2011 | Wahlsten | G03F 7/70383 700/103 |
| 2011/0295408 A1* | 12/2011 | Burgel | G05B 19/401 700/114 |
| 2012/0098958 A1* | 4/2012 | Metzler | B25J 9/1697 348/95 |
| 2013/0090755 A1 | 4/2013 | Kiryu et al. | |
| 2013/0094932 A1* | 4/2013 | Kutsukake | B25J 9/1697 414/680 |
| 2013/0278725 A1* | 10/2013 | Mannan | G06F 17/5086 348/46 |
| 2013/0278751 A1* | 10/2013 | Kranitzky | G06T 7/75 348/94 |
| 2014/0003705 A1* | 1/2014 | Taguchi | G06T 7/344 382/154 |
| 2014/0012416 A1* | 1/2014 | Negishi | B25J 9/1607 700/251 |
| 2014/0309766 A1 | 10/2014 | Kunimitsu et al. | |
| 2015/0219451 A1* | 8/2015 | Pettersson | G01B 5/008 33/503 |
| 2016/0012588 A1* | 1/2016 | Taguchi | G06T 7/0018 348/46 |

OTHER PUBLICATIONS

Taguchi etal, "Point-Plane SLAM for Hand-Held 3D Sensors", May 2013, pp. 10. (Year: 2013).*

Jin etal, "The Position/Orientation Determination of a Mobile-Task Robot Using an Active Calibration Scheme", 2003, pp. 1431-1442. (Year: 2003).*

Guo et al, Efficient Registration of Multiple Range Images for Fully Automatic 3D Modeling, Jan. 8, 2014, pp. 8. (Year: 2014), retrieved from the internet https://ieeexplore.ieee.org/document/7296036.*

Wikipedia, "Image Registration", Jan. 2019; p. 4. (Year: 2019), retrieved from the internet https://en.wikipedia.org/wiki/Image_registration.*

Matlab Image processing Toolbox, "Registering an Image", 2002, pp. 1 (Year: 2002), retrieved from the internet https://edoras.sdsu.edu/doc/matlab/toolbox/images/registr3.html.*

Paudel et al, "LMI-based 2D-3D Registration: from Uncalibrated Images to Euclidean Scene" Jun. 2015, pp. 4494-4502 downloaded from the internet https://www.cv-foundation.org/openaccess/content_cvpr_2015/papers/Paudel_LMI-Based_2D-3D_Registration_2015_CVPR_paper.pdf (Year: 2015).*

Chen et al, "Image Registration with Uncalibrated Cameras in Hybrid Vision Systems", 2005, pp. 1-6 downloaded from the internet https://ieeexplore.ieee.org/document/4129513 (Year: 2005).*

* cited by examiner

SYSTEM AND METHOD FOR PERFORMING OPERATIONS OF NUMERICAL CONTROL MACHINES

FIELD OF THE INVENTION

This invention relates generally to numerical control machining, and more particularly to registering a coordinate system of a workpiece with a coordinate system of a numerical control machine.

BACKGROUND OF THE INVENTION

Numerical control (NC) machines can perform various operations, such as milling, drilling, and cutting, to a workpiece using a tool. The size and shape of a workpiece can be arbitrary. Usually, a relationship between a coordinate system of the workpiece and a coordinate system of the NC machine is unknown, because the workpiece can be placed in the NC machine with an arbitrary position and orientation by human operators or robots. Therefore, before performing any operation to the workpiece, the coordinate system of the NC machine needs to be registered with the coordinate system of the workpiece. Then, the relationship between the workpiece coordinate system and the machine coordinate system can be defined as, for example, a rigid-body transformation.

The definition of the workpiece coordinate system depends on the shape of the workpiece. For example, for a cuboid-shaped workpiece, one of the corners of the cuboid can be specified as the origin of the workpiece coordinate system, and the edges of the cuboid connected to the origin can be defined as the X, Y, and Z axes of the workpiece coordinate system. For another example, for a cylindrical-shaped workpiece, the center of the top face of the cylinder can be defined as the origin of the workpiece coordinate system, the axis of the cylinder can be defined as the Z axis, and the X and Y axes can be defined arbitrary on the top face. If a three-dimensional (3D) model, such as a computer-aided design (CAD) model, of the workpiece is available, then the workpiece coordinate system can be defined arbitrarily in the 3D model.

The number of degrees of freedom (DOF) required for the registration, i.e., the number of DOF in the rigid-body transformation, depends on the assumptions and applications. For example, to mill a cuboid-shaped metal piece placed on a flat platform in an NC machine, one needs to determine the distance between the machining tool and the workpiece along the Z axis, and the X and Y positions of the origin of the workpiece; thus the transformation includes 3-DOF translation. Some applications do not need the X and Y positions. In those applications, the transformation includes only 1-DOF translation, i.e., the distance along the Z axis. On the other hand, if the cuboid-shaped metal piece is placed on the platform with an angle, then it is necessary to determine the full 6-DOF transformation, i.e., 3-DOF translation and 3-DOF rotation.

Currently the registration between the coordinate systems of the workpiece and the NC machine is performed with the methods internal to the NC machines, i.e., those methods are associated and implemented by each NC machine. For example, one method determines the registration by sensing surfaces of the workpiece with a probe of the NC machine. Naturally, the data acquired by the probes for one NC machine cannot be used with another NC machine.

Another method uses a 3D sensor attached in an NC machine to reconstruct a 3D model of the workpiece and determine the transformation. The 3D sensor is fixed and calibrated with respect to the NC machine. The registration capability of that method also cannot be shared across multiple NC machines and requires a dedicated 3D sensor installed at each NC machine.

SUMMARY OF THE INVENTION

It is an object of some embodiments of the invention to provide a method for machining a workpiece by a numerical control (NC) machine and for determining the transformation between a coordinate system of an NC machine and a coordinate system of a workpiece. It is another object of some embodiments to provide a registration method between a workpiece and the NC machine that does not require registration hardware dedicated to the NC machine.

Some embodiments register a model of the NC machine and a model of a workpiece with a model of a scene including at least a part of the NC machine and a part of the workpiece to determine a transformation between the NC machine and the workpiece and reuse this technique for multiple registrations with different NC machines. In such a manner, some embodiments require neither a dedicated sensor installed at each NC machine, nor the calibration between the sensor and the NC machine. This allows the sensor to be placed in different places with respect to the NC machine, or even hand-held by a human operator who scans the workpiece and the NC machine. The same sensor can be used to perform the registration task for multiple NC machines.

Some embodiments use a three-dimensional (3D) model of the NC machine, and register the machine 3D model with respect to the reconstructed 3D model, which provides the transformation between the machine 3D model and the reconstructed 3D model. Some embodiments also detect the workpiece in the reconstructed 3D model to obtain the transformation between the reconstructed 3D model and the workpiece. By concatenating the two transformations, some embodiments obtain the desired transformation between the machine coordinate system and the workpiece coordinate system.

Some embodiments of the invention are based on recognition that registration of the workpiece with a coordinate system of the NC machine is an auxiliary process of the NC operation and should be distinguished from the actual NC operations for milling, drilling or cutting the workpiece. Therefore, there is a need for a system and a method that can be used, e.g., concurrently or sequentially, for registration by multiple NC machines without requiring a dedicated hardware installed at each NC machine.

Some embodiments of the invention are based on general recognition that the registration of the workpiece with a coordinate system of the NC machine can be done by an uncalibrated 3D sensor. Specifically, if the 3D sensor concurrently acquires images of at least a portion of the workpiece and at least a portion of the NC machine, that portion of the NC machine can be registered with the coordinate system of the NC machine using a model of the NC machine, and that portion of the workpiece can be registered with the coordinate system of the workpiece, allowing the workpiece to be registered with the NC machine through the reconstructed 3D model.

Some embodiments of the invention are based on realization that the lack of requirement of calibration of the 3D sensor and the need to acquire images of only a portion of the NC machine allows to arrange the 3D sensor such that the same sensor, concurrently or sequentially, captures the scene including portions of different NC machines, and, thus, can be reused for registration by multiple NC machines.

For example, in one embodiment, the 3D sensor is arranged in a premise with multiple NC machines. For example, the sensor is installed near the ceiling substantially at the center of the premise to capture concurrently portions of all NC machines in the premise. In this embodiment, the sensor can be used for performing the registration of the workpieces with corresponding NC machines concurrently. In another embodiment, the sensor is installed movably, e.g., rotatably, to acquire the images sequentially. In yet another embodiment, the sensor is a hand-held camera that can be reused for performing the registration when needed.

Accordingly, one embodiment discloses a method for machining a workpiece by a numerical control (NC) machine. The method includes constructing a model of a scene from one or multiple images of the scene including at least a part of the workpiece and at least a part of the NC machine; registering a model of the NC machine with the model of the scene to produce a first transformation between a coordinate system of the model of the scene and a coordinate system of the NC machine; detecting the workpiece in the model of the scene to produce a second transformation between the coordinate system of the model of the scene and a coordinate system of the workpiece; combining the first and the second transformations to register the coordinate system of the workpiece with the coordinate system of the NC machine; and machining the registered workpiece with a tool of the NC machine according to the registration of the coordinate system of the workpiece with the coordinate system of the NC machine, wherein at least some steps of the methods are performed by at least one processor.

Another embodiment discloses a system for numerical control (NC) machining including a set of NC machines, wherein each NC machine includes a platform for positioning a workpiece, a tool for machining the workpiece, and a controller for controlling the machining; a three-dimensional (3D) sensor acquiring one or multiple images including at least a part of each NC machine and a part of a corresponding workpiece; and a processor operatively connected to the 3D sensor and to the controllers of the NC machines to register, before an operation of each NC machine, the workpiece arranged on the platform of the NC machine with a coordinate system of the NC machine.

DETAILED DESCRIPTION OF THE PREFERRED EMBODIMENTS

Figure 1A:
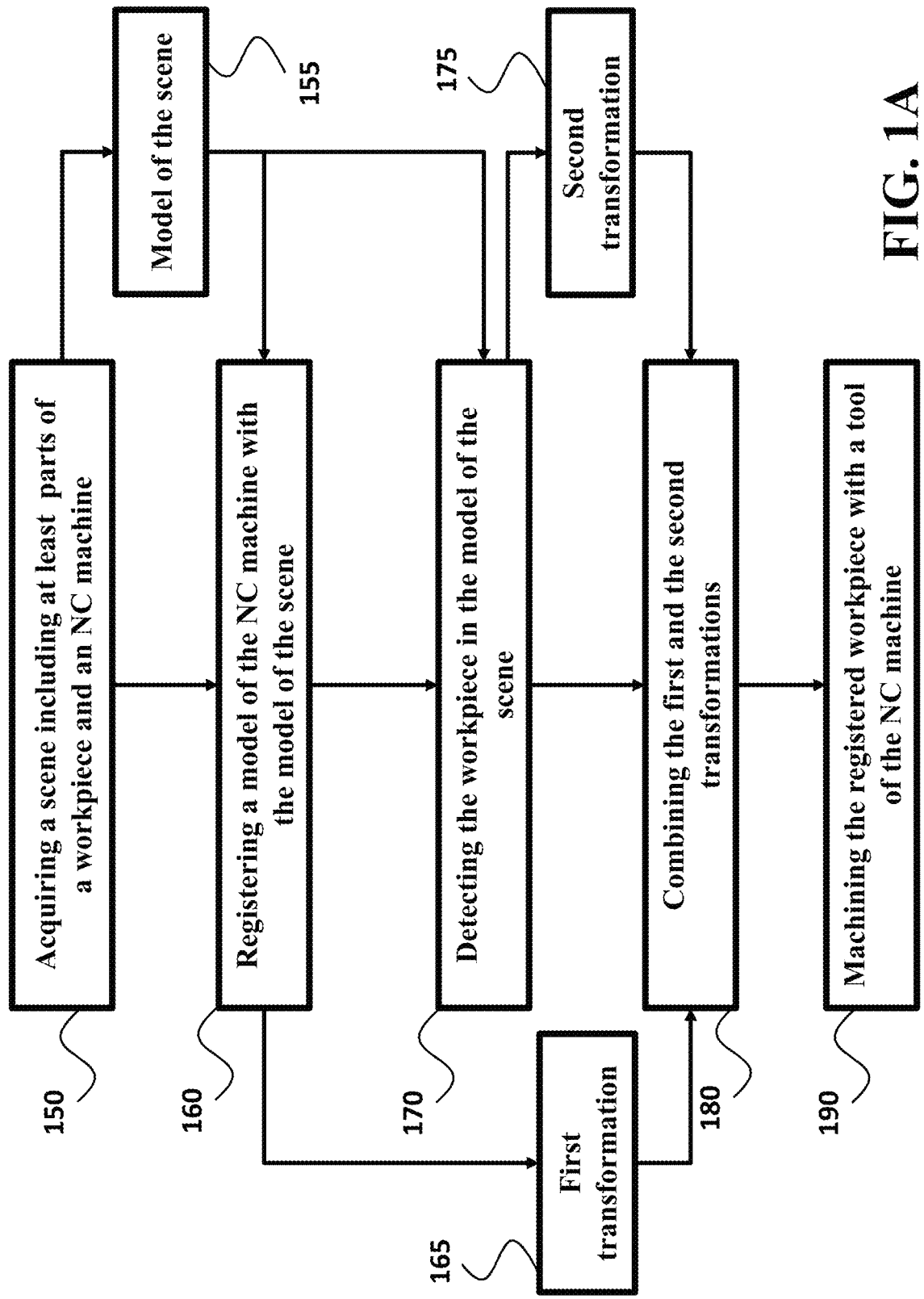
FIG. 1A is a block diagram of a method for machining a workpiece by a numerical control (NC) machine according to some embodiments of an invention.

FIG. 1A shows a block diagram of a method for machining a workpiece by a numerical control (NC) machine according to one embodiment of an invention. The embodiment acquires 150 images of a scene including at least a part of the workpiece and at least a part of the NC machine to construct a model 155 of the scene, and registers 160 a model of the NC machine with the model of the scene to produce a first transformation 165 between a coordinate system of the model of the scene and a coordinate system of the NC machine. The embodiment also detects 170 the workpiece in the model of the scene to produce a second transformation 175 between the coordinate system of the model of the scene and a coordinate system of the workpiece, and combines 180 the first and the second transformations to register the coordinate system of the workpiece with the coordinate system of the NC machine, thereby registering the workpiece with the NC machine. Next, the embodiment machines 190 the registered workpiece with a tool of the NC machine. At least some steps of the methods are performed by at least one processor 100.

The model of the scene can include a set of NC machines captured concurrently or sequentially. Each NC machine includes a platform for positioning a workpiece for machining, a tool for machining the workpiece, and a processor 100 for controlling the machining. For example, the scene can be acquired using a sensor capturing one or multiple images including at least a part of each NC machine in the set. In such a manner, a processor 100 operatively connected to the 3D sensor and to the processors of the NC machines can register, before an operation of each NC machine, the workpiece arranged on the platform of the NC machine with a coordinate system of the NC machine.

Figure 1B:
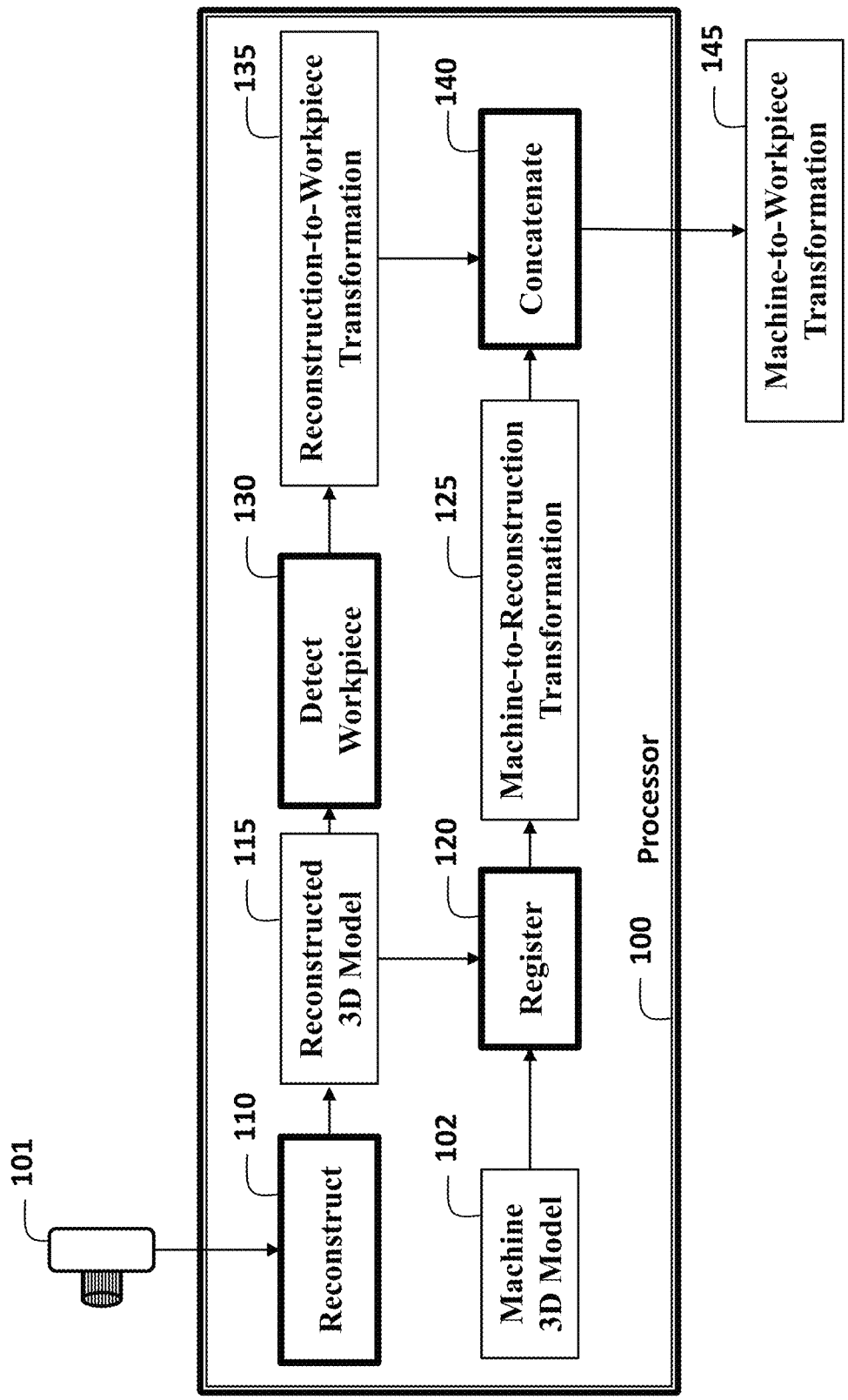
FIG. 1B is a flow diagram of a method for registering a workpiece with the coordinate system of an NC machine according to some embodiments of the invention.

FIG. 1B shows a flow diagram of an exemplar embodiment registering a workpiece with an NC machine using a three-dimensional (3D) sensor 101 and the processor 100, such as a structured light sensor or a time-of-flight sensor, for representing the scene as a set of 3D points. The 3D sensor can be placed at a fixed position or held by a human operator. Some embodiments assume that a 3D model of the NC machine 102 is available.

Using the 3D sensor, some embodiments reconstruct 110 a 3D model 115 that includes at least a part of the workpiece and at least a part of the NC machine. The reconstructed 3D model 115 can be a single image obtained from the 3D sensor, or can include multiple images obtained by moving the 3D sensor and registered with each other using simultaneous localization and mapping (SLAM) techniques.

The reconstructed 3D model 115 is registered 120 to the machine 3D model 102 by matching the part of the NC machine included in the reconstructed 3D model with respect to the machine 3D model. The registration provides the transformation between the reconstructed 3D model and the machine 3D model, which we refer to as the machine-to-reconstruction transformation 125. For example, some embodiments use a plane-based registration method. Some embodiments first specify corresponding planes in the reconstructed 3D model and the machine 3D model. Alternative embodiments use other geometrical primitives such as points or lines for the registration.

For example, one embodiment uses at least three corresponding planes with normals that span the 3D space, and determines the transformation between the planes, i.e., transformation between the reconstructed 3D model and the machine 3D model. Alternatively, some embodiments use a point-based registration with at least three corresponding, but not collinear points. Those embodiments can determine the transformation between the points, i.e., transformation between the reconstructed 3D model and the machine 3D model. The corresponding points can be specified manually, similar to the case of the corresponding planes, or automatically by using a 3D keypoint detector and descriptor. Some embodiments can also use a combination of the point and plane correspondences for the registration.

In the reconstructed 3D model 115, some embodiments also detect 130 the workpiece to obtain the transformation 135 between the reconstructed 3D model and the workpiece. Some embodiments refer to this transformation as the reconstruction-to-workpiece transformation 135. For detecting the workpiece, the embodiments can use different strategies depending on whether a 3D model of the workpiece is available or not. For example, if the 3D model of the workpiece is available, then some embodiments can register the workpiece 3D model with respect to the reconstructed 3D model, similar to the registration between the machine 3D model and the reconstructed 3D model using the plane-based or point-based registration algorithm as described above.

Alternatively, some embodiments use an interactive approach, where a human operator specifies some predefined positions of the workpiece in the reconstructed 3D model, e.g., by using a mouse click interface. If only the 3-DOF translation is required for the registration (e.g., for the case where a cuboid-shaped workpiece is placed on a flat platform), then the human operator needs to specify only the position of the origin of the workpiece in the reconstructed 3D model. If the full 6-DOF transformation is required, then the human operator needs to specify three predefined positions of the workpiece (e.g., three corners) to obtain the 6-DOF transformation using the point-based registration algorithm.

Next, the machine-to-reconstruction transformation 125 and the reconstruction-to-workpiece transformation 135 can be concatenated 140 to obtain the machine-to-workpiece transformation 145.

Figure 2:
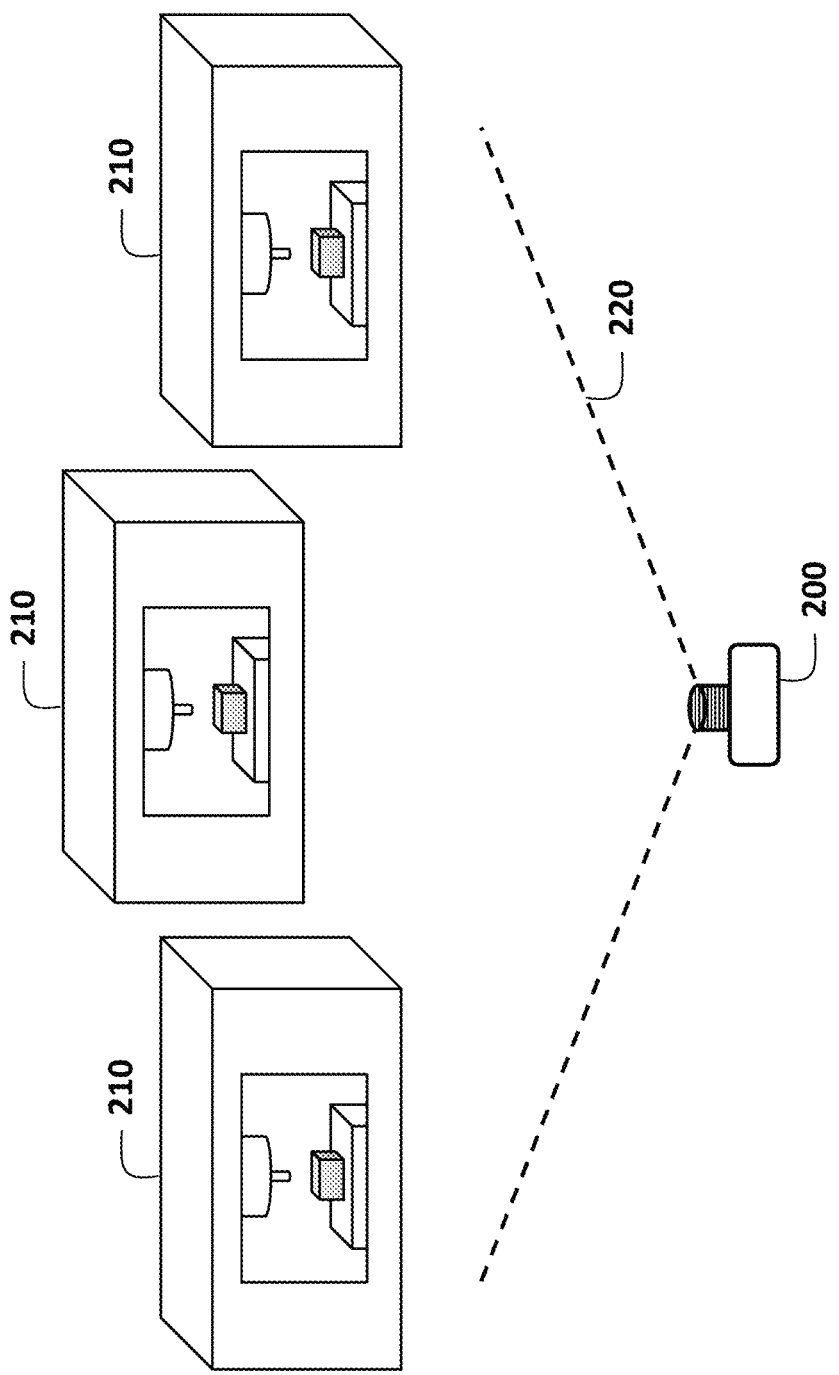
FIG. 2 is a schematic of using the method of FIG. 1A and/or FIG. 1B with a fixed 3D sensor to concurrently register multiple workpieces with coordinate systems of multiple NC machines according to one embodiment of the invention.

FIG. 2 shows an example of using the method with a static 3D sensor 200 to concurrently perform the registration for multiple NC machines 210. The 3D sensor is installed so that multiple NC machines are in the field of view 220 of the 3D sensor and the images can be acquired concurrently.

Figure 3:
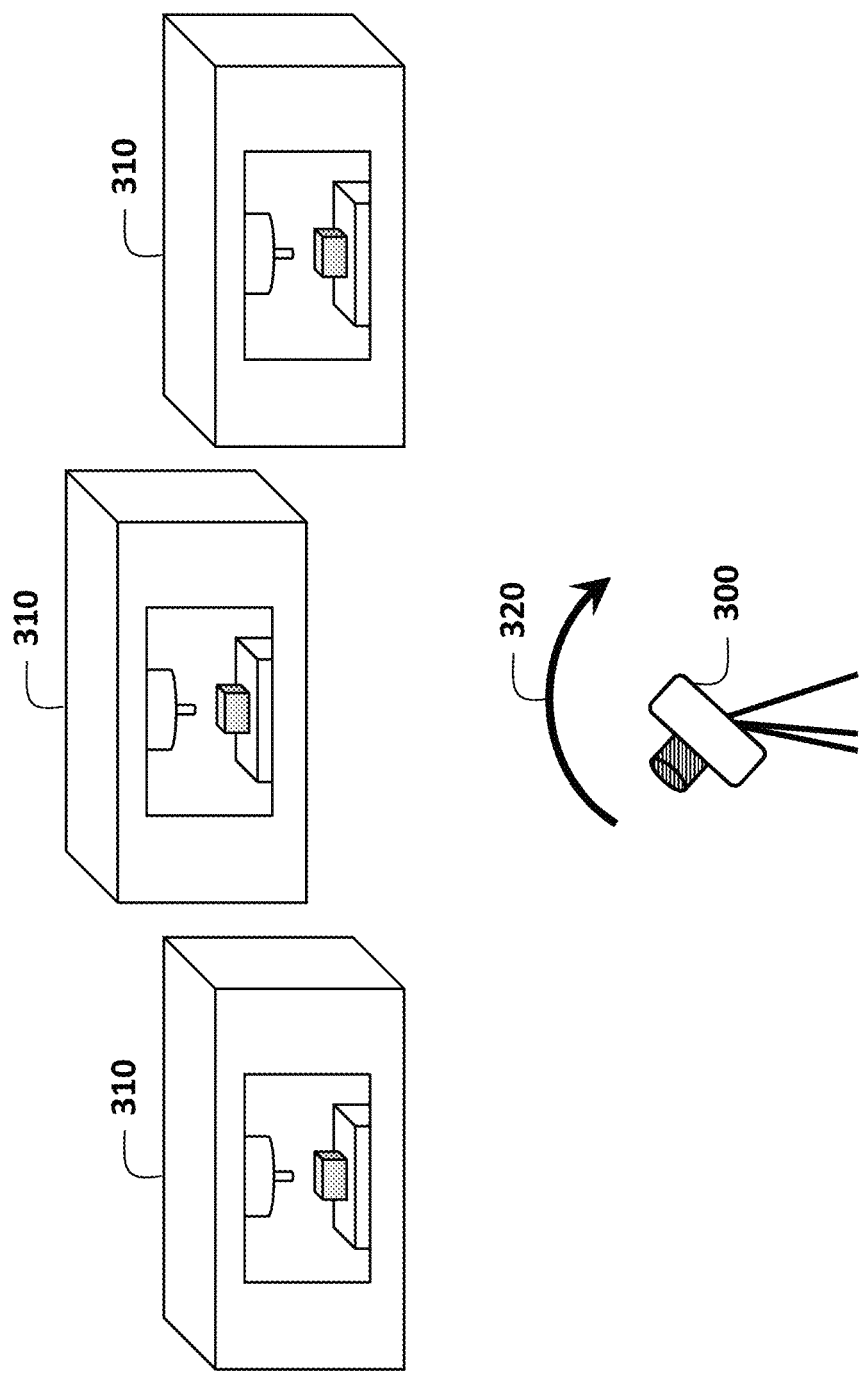
FIG. 3 is a schematic of using the method of FIG. 1A and/or FIG. 1B with a movable 3D sensor to sequentially perform registering multiple workpieces with coordinate systems of multiple NC machines according to one embodiment of the invention.

FIG. 3 shows an example of using the method with a movable 3D sensor 300 to sequentially perform the registration for multiple NC machines 310. Specifically, the 3D sensor moves 320, e.g., rotates or translates, to acquire the images of the NC machines sequentially.

Figure 4:
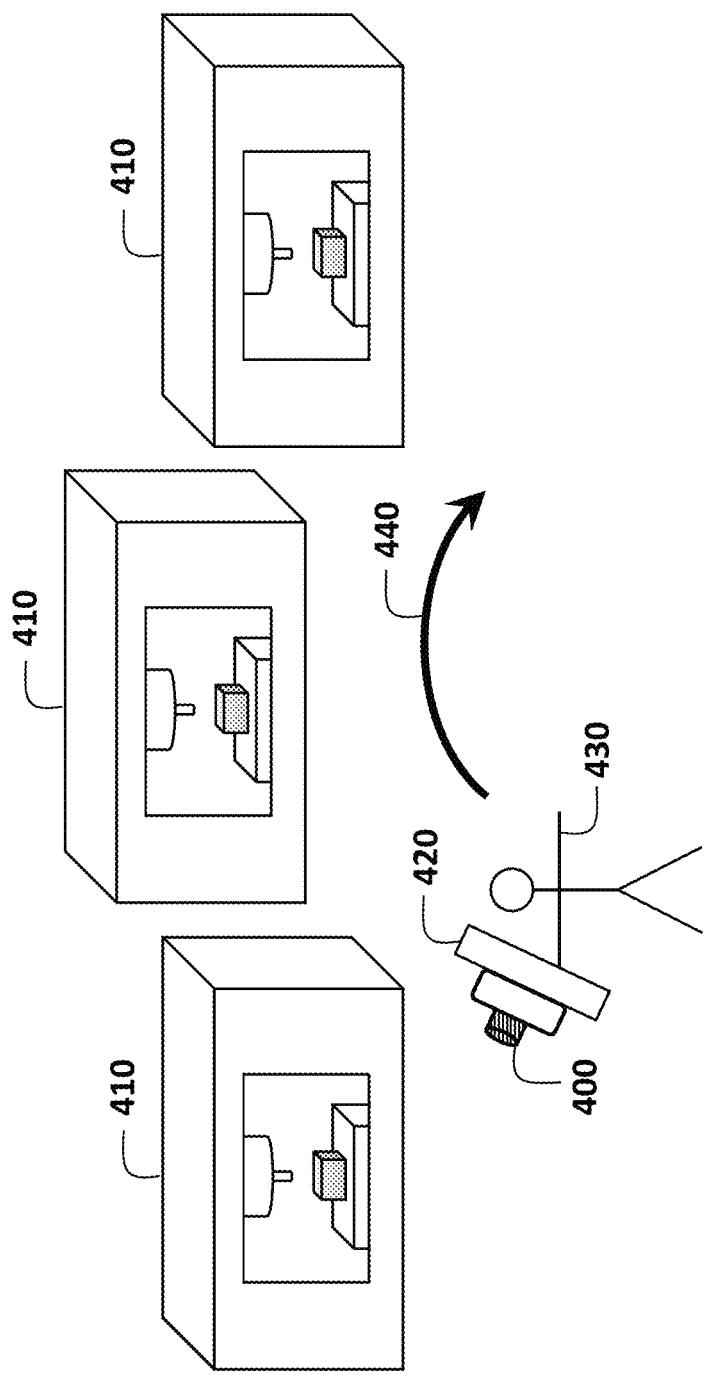
FIG. 4 is a schematic of using the method of FIG. 1A and/or FIG. 1B with a hand-held 3D sensor to sequentially perform registering multiple workpieces with coordinate systems of multiple NC machines according to one embodiment of the invention.

FIG. 4 shows an example of using the method with a hand-held 3D sensor 400 to sequentially perform the registration for multiple NC machines 410. Here the 3D sensor is connected to a mobile computer 420 and held by a human operator 430. The human operator moves 440 to sequentially acquire the images, e.g., on demand.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for machining a workpiece by a numerical control (NC) machine, comprising:

acquiring images of a scene represented by a set of three-dimensional (3D) points using a 3D sensor, wherein the images of the scene include a set of a plurality of NC machines and a corresponding set of workpieces;

providing a 3D model of an NC machine for each of the set of NC machines;

constructing a 3D model of the scene from the images of the scene including at least a part of each of the set of NC machines and at least a part of each of the corresponding set of workpieces;

registering the constructed 3D model of the scene with the 3D model of the NC machine for each of the set of NC machines by matching the part of each of the set of NC machines included in the constructed 3D model of the scene with respect to the machine 3D model to produce a first transformation between a coordinate system of the constructed 3D model of the scene and a coordinate system of each of the set of NC machines in the 3D model of each of the NC machines;

detecting each of the corresponding set of workpieces included in the constructed 3D model of the scene to produce a second transformation between the coordinate system of the constructed 3D model of the scene and a coordinate system of each of the corresponding set of workpieces;

combining the first and the second transformations to register the coordinate system of each of the set of NC machines with the coordinate system of each of the corresponding set of workpieces; and machining each of the corresponding set of the registered workpieces with a tool of each of the set of NC machines according to the registration of the coordinate system of each of the set of NC machines with the coordinate system of each of the corresponding set of the registered workpieces, wherein at least some steps of the method are performed by at least one processor.

2. The method of claim 1, further comprising:
registering, before an operation of each NC machine, the coordinate system of each NC machine with the coordinate system of the corresponding workpiece.

3. The method of claim 2, wherein the 3D sensor is static while acquiring the images.

4. The method of claim 2, wherein the 3D sensor is moving while acquiring the images.

5. The method of claim 2, wherein the 3D sensor is a hand-held camera.

6. A system for numerical control (NC) machining, comprising:
a set of a plurality of NC machines and a corresponding set of workpieces, wherein each of the set of NC machines includes a platform for positioning a workpiece, a tool for machining the workpiece, and a controller for controlling the machining;
a three-dimensional (3D) sensor acquiring images of a scene including at least a part of each of the NC machines and at least a part of each of the corresponding set of workpieces, wherein the images of the scene include the set of NC machines and the corresponding set of workpieces, wherein each of the images is represented by a set of 3D points; and a processor configured to perform a method of claim 1 and operatively connected to the 3D sensor and to the controllers of the NC machines to register, before an operation of each NC machine, the workpiece arranged on the platform of the NC machine with a coordinate system of the NC machine.

7. The system of claim 6, wherein the 3D sensor acquires the images concurrently.

8. The system of claim 6, wherein the 3D sensor acquires the images sequentially.

9. The system of claim 6, wherein the 3D sensor acquires the images upon demand.

10. The system of claim 6, wherein, for each NC machine, the processor registers the corresponding workpiece using a reconstructed 3D model of the scene by
registering the reconstructed 3D model to a 3D model of the NC machine to obtain a first transformation between the reconstructed 3D model and the 3D model of the NC machine;
detecting the part of the workpiece in the reconstructed 3D model to obtain a second transformation between the reconstructed 3D model and the workpiece; and
combining the first and the second transformations to register the workpiece with the NC machine.

* * * * *